United States Patent
Hirakawa

(10) Patent No.: US 6,636,144 B1
(45) Date of Patent: Oct. 21, 2003

(54) DATA TRANSMISSION APPARATUS HAVING A FINGERPRINT READER AND METHOD THEREOF

(75) Inventor: Masaya Hirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/527,524

(22) Filed: Mar. 16, 2000

(30) Foreign Application Priority Data

Mar. 16, 1999 (JP) .......................................... 11-071063

(51) Int. Cl.$^7$ ........................... G05B 19/00; G06F 7/00; G06K 9/00; G06T 1/100; H04Q 9/100
(52) U.S. Cl. ...................... 340/5.53; 340/5.1; 340/5.22; 340/5.52; 30/5.8
(58) Field of Search .................. 340/5.53, 5.1, 340/5.22, 5.52, 5.8, 5.83; 382/116, 124; 379/93.03

(56) References Cited

U.S. PATENT DOCUMENTS

| | | | | |
|---|---|---|---|---|
| 5,990,803 A | * | 11/1999 | Park ...................... | 340/825.34 |
| 6,100,811 A | * | 8/2000 | Hsu et al. ............... | 340/825.31 |
| 6,111,977 A | * | 8/2000 | Scott et al. .................. | 382/124 |
| 6,255,961 B1 | * | 7/2001 | Van Ryzin et al. ...... | 340/825.25 |
| 6,373,967 B2 | * | 4/2002 | Pu et al. ...................... | 382/115 |

OTHER PUBLICATIONS

Seigo Igaki, Hironori Yahagi, Shin Eguchi, Hiroyuki Ideka, Takefumi Inagaki, *Personal Identification Terminal using Holographic Fingerprint Sensor*, pp. 27–33, 1987.

*A Direct Fingerprint Reader*, pp. 272–279.

Ko Asai, Yukio Hoshino, Kazuo, Kiji, *Automated Fingerprint Identification by Minutia–Network Feature—Feature Extraction Process—*, pp. 724–732, May, 1989.

Ko Asai, Yukio Hoshino, Kazuo, Kiji, *Automated Fingerprint Identification by Minutia–Network Feature—Matching Processes—*, pp. 733–740, May, 1989.

Osamu Eguchi, Toshiharu Kamiya, Michinaga Nagura, *Fingerprint Verification System using Pattern– Matching Algorithm*, pp. 65–72, 1988.

Masahiro Kawagoe, Akio, Munekami, *Automatic Classification of Fingerprint Pattern*, pp. 1–8, May 20, 1982.

Akihiro Shimizu, Masahiko Hase, *Entry Method of Fingerprint Image with Prism—Comparison between Total Reflection Method and Light–Path Separation Method—*, pp. 414–415, Mar. 1985.

* cited by examiner

Primary Examiner—Michael Horabik
Assistant Examiner—Vernal U Brown
(74) Attorney, Agent, or Firm—Sughrue Mion, PLLC

(57) ABSTRACT

A storage unit contains previously stored control data for controlling an electrical device and a fingerprint feature of a user's finger in association with each other. The fingerprint feature of the user's finger is acquired by a fingerprint image input unit and a fingerprint feature extraction unit. The control data is read from the storage unit in accordance with the acquired fingerprint feature. The read control data is transmitted to the electrical device, thereby controlling the electrical device.

26 Claims, 10 Drawing Sheets

| FINGERPRINT FEATURE | TRANSMISSION DATA |
|---|---|
| F1 | D1 |
| F2 | D2 |
| ... | ... |
| Fn | Dn |

FIG. 3

| FINGERPRINT FEATURE | TRANSMISSION DATA |
|---|---|
| USER A'S RIGHT FOREFINGER | TV 8ch |
| USER A'S LEFT THUMB | VIDEO CASSETTE RECORDER PLAY |
| USER B'S RIGHT MIDDLE FINGER | AUDIO SYSTEM PLAY |
| ... | ... |

FIG. 4

| TV | |
|---|---|
| FINGERPRINT FEATURE | TRANSMISSION DATA |
| USER A'S RIGHT FOREFINGER | 8ch |
| USER A'S LEFT THUMB | 4ch |
| USER B'S RIGHT FOREFINGER | 1ch |
| ... | ... |

| VCR | |
|---|---|
| FINGERPRINT FEATURE | TRANSMISSION DATA |
| USER A'S LEFT FOREFINGER | PLAY |
| USER A'S LEFT THUMB | RAPID TRAVERSE |
| USER B'S LEFT FOREFINGER | REWIND |
| ... | ... |

| AUDIO SYSTEM | |
|---|---|
| FINGERPRINT FEATURE | TRANSMISSION DATA |
| USER A'S RIGHT FOREFINGER | CD PLAY |
| USER A'S RIGHT THUMB | RADIO ON |
| USER B'S RIGHT MIDDLE FINGER | MD PLAY |
| ... | ... |

| AIR CONDITIONER | |
|---|---|
| FINGERPRINT FEATURE | TRANSMISSION DATA |
| USER A'S LEFT FOREFINGER | COOLING TO 20°C |
| USER A'S LEFT THUMB | HEATING TO 25°C |
| USER B'S LEFT MIDDLE FINGER | COOLING TO 18°C |
| ... | ... |

FIG. 9

| VCR FINGERPRINT FEATURE | TRANSMISSION DATA |
|---|---|
| USER A'S LEFT FOREFINGER | PLAY |
| USER A'S LEFT THUMB | RADIO TRAVERSE |
| USER B'S LEFT FOREFINGER | REWIND |
| USER C'S RIGHT THUMB | PLAY |
| ... | ... |

FIG. 12

DATA TRANSMISSION APPARATUS HAVING A FINGERPRINT READER AND METHOD THEREOF

BACKGROUND OF THE INVENTION

1. Field of the Invention

The present invention relates to a data transmission apparatus having a fingerprint reader and a method thereof. Particularly, it relates to a data transmission apparatus having a fingerprint reader and a method thereof capable of remotely controlling an electrical device.

2. Description of the Related Art

As for a conventional data transmission apparatus, there is a remote controller for a home electrical apparatuses such as a television, a video cassette recorder (VCR), an audio system, and an air conditioner. The conventional data transmission apparatus transmits data to remotely control these electrical devices utilizing infrared rays. A button is arranged for every command for operating the electrical device. Data corresponding to the depressed button is transmitted to the electrical device to make it execute the corresponding command.

However, such a conventional remote controller has the following various problems. First of all, since a plurality of remote controllers are present in a home, it tends to be troublesome to put each of the remote controllers to proper use. That is, home electrical apparatuses such as a television, a video cassette recorder, an audio system and an air conditioner have separate remote controllers, and hence a user has to possess as many remote controllers as the number of home electrical devices that the user possesses. As a result, it can be inconvenient to use the apparatuses. In addition, a second problem is such that since a large number of buttons for transmitting various commands are arranged in one remote controller, it takes a long time for the user to perfectly master manipulation of a remote controller. Furthermore, a third problem is such that since the buttons arranged in the remote controller have one-to-one correspondence to the commands, the presence of the buttons for the less-frequently used commands becomes useless.

In addition, a fourth problem is such that since the remote controller can be readily touched even by a child, an unexpected malfunction may be caused by a child. Furthermore, a fifth problem is that, for example, in the case where a plurality of people share a remote controller for a single air conditioner, the temperature setting needs to be changed whenever the user of the remote controller changes. That is, with respect to setting the temperature for an air conditioner, the temperature setting at which a user feels comfortable is different for different people, and hence the temperature needs to be reset depending on the person.

SUMMARY OF THE INVENTION

It is therefore an object of the present invention to provide a data transmission apparatus and a method thereof capable of readily carrying out command transmission for controlling an electrical device.

Another object of the present invention is to provide a data transmission apparatus and a method thereof capable of transmitting a plurality of commands without a user's complicated operation.

Still another object of the present invention is to provide a data transmission apparatus and a method thereof capable of specifying a person who operates the apparatus for data transmission.

Still another object of the present invention is to provide a data transmission apparatus and a method thereof capable of integrating a remote controlling function for a plurality of electrical devices.

Still another object of the present invention is to provide a data transmission apparatus and a method thereof capable of independently operating for a plurality of people.

In order to achieve the above objects, a data transmission apparatus of an embodiment of the present invention comprises a storage unit for storing control data for controlling an electrical device and a fingerprint feature of a user's finger, wherein the control data is associated with the fingerprint feature, a fingerprint reader for acquiring the fingerprint feature of the user's finger, and a transmitter for reading out the stored control data from the storage unit in accordance with the fingerprint feature acquired by the fingerprint reader as transmission data and transmitting the transmission data to the electrical device.

In order to achieve the above objects, a method of transmitting control data for controlling an electrical device, according to an embodiment of the present invention, comprises acquiring a fingerprint feature of a user's finger, reading out a control data from a storage unit in accordance with the acquired fingerprint feature, and transmitting the control data read out from the storage unit to the electrical device.

BRIEF DESCRIPTION OF THE DRAWINGS

These and other objects, features and advantages of this invention will become more fully apparent from the following detailed description taken with the accompanying drawings in which:

FIG. 3 is a diagram showing data which is stored in the apparatus shown in FIG. 1;

FIG. 4 is a diagram showing an example of the data shown in FIG. 3;

FIG. 9 is a diagram showing an example of data shown in FIG. 7;

FIG. 12 is a diagram showing an example of data which is stored in the apparatus shown in FIG. 10.

DETAIL DESCRIPTION OF THE PREFERRED EMBODIMENTS

Figure 1:
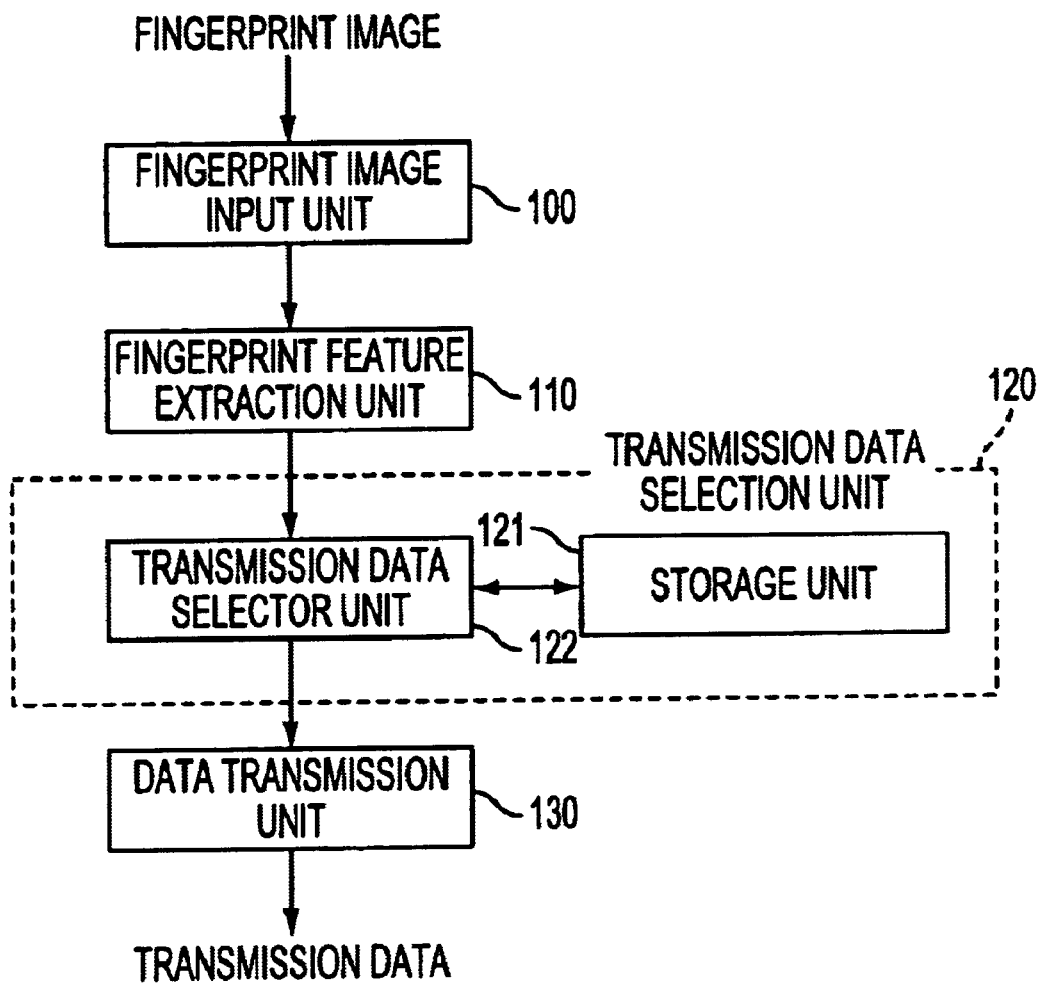
FIG. 1 is a block diagram showing a data transmission apparatus according to a first embodiment of the present invention.

Preferred embodiments of the present invention will be discussed in detail with reference to the drawings. Referring to FIG. 1, a first embodiment according to the present invention has a fingerprint image input unit 100, a fingerprint feature extraction unit 110, a transmission data selection unit 120 and a data transmission unit 130.

The fingerprint image input unit 100 reads out, when a finger of a user touches thereon, an image of the fingerprint of the user's finger and converts the fingerprint image into a digital image data so as to be able to process the fingerprint image in the fingerprint feature extraction unit 110. The digital image data is sent to the fingerprint feature extraction unit 110. As for the fingerprint image input unit 100, any of a number of conventional methods can be utilized as long as it can read out the fingerprint image of a user's finger. For example, an optical scanner described in "Automatic Classification of Fingerprint Pattern (The Special Interest Group Notes of IPSP, Vol. CV 18, No. 2, 1982, pp. 1 to 8)" and "Fingerprint Information Detecting Method Employing a Prism—Comparison of Total Reflection Method with Optical Path Separating Method (The Transactions of the Institute of Electronics, Information And Communication Engineerings (D), Vol. J68-D, No. 3, 1985, pp. 414 to 415)" can be used. A scanner employing a hologram, described in "Personal Comparison Apparatus Employing Holographic Fingerprint Sensor (IEICE Technical Report, Vol. PRU 87, No. 31, 1987, pp. 27 to 33)" and a scanner with a semiconductor sensor utilizing electrostatic capacity described in "A Direct Fingerprint Reader (Proceedings of CardTech/SecureTech, Vol. I: Technology, 1996, pp. 272 to 279)", can also be used. Moreover, a scanner utilizing a ultrasonic wave described in "Improved image quality of live scan fingerprint scanners using acoustic backscatter measurements (Proceedings of Biometric Consortium $8^{th}$ Meeting, 1996)", and a scanner with a semiconductor sensor utilizing a thermal sensing described in "Thermal imaging fingerprint technology (Proceedings of Biometric Consortium gth Meeting, 1997)" can also be used to input a fingerprint image.

The fingerprint feature extraction unit 110 receives the digital image data indicative of the fingerprint image from the fingerprint image input unit 100 to execute the processing of extracting the fingerprint features, which are used in discrimination of the fingerprint. As for the method of realizing the fingerprint feature extraction, there is known the Manutia method described in "Automatic Fingerprint Comparison Based on Manutia Network Features—Feature Extraction Process (The Transactions of the Institute of Electronics, Information And Communication Engineerings (D-II), Vol. J72-D-II, No. 5, 1989, pp. 724 to 732)." This Manutia method is such that a ridge line pattern is extracted from a variable density image including fingerprint ridge lines, by using binary coded processing and core line processing. After positions of the end points and branch points of the ridge line pattern of the fingerprint image have been detected, the number of crossover ridge lines which link between the end points and the branch points are counted. A relation diagram is expressed in the form of digital data to form fingerprint features for matching. In addition thereto, fingerprint features can be extracted by means of an image matching method. Data indicative of the extracted fingerprint features (hereinafter, referred to as "the input fingerprint features") is supplied to the transmission data selector unit 122.

The transmission data selection unit 120 includes a storage unit 121 and a transmission data selector unit 122. The storage unit 121 stores a correspondence table between the fingerprint features Fi (i=1, 2, ..., N; N is positive integer) and transmission data Di that are assigned to the respective fingerprint features Fi. The correspondence table is shown in FIG. 3.

The transmission data selector unit 122 carries out the fingerprint matching of the input fingerprint features Fj, which has been supplied from the fingerprint feature extraction unit 110, with the fingerprint features Fi which were previously stored in the storage unit 121. If the fingerprint feature Fk (k=1, 2, ..., N; N is positive integer) is present in the previous stored fingerprint features Fi in which the fingerprint matching score exceeds a predetermined threshold, the transmission data selector unit 122 sends the transmission data Dk registered in the storage unit 121 and corresponding to the fingerprint feature Fk to the data transmission unit 130. On the other hand, if the fingerprint feature Fk in which the fingerprint matching score exceeds the predetermined threshold, is absent, no processing is executed. Or the user is informed of the fact that none of the fingerprint features Fi matching with the input fingerprint feature Fj is stored in the storage unit 121.

As for the method of realizing the fingerprint matching, the Manutia method described in "Automatic Fingerprint Comparison Based on Manusha Network Features—Comparison Process (The Transactions of the Institute of Electronics, Information And Communication Engineerings (D-II), Vol. J72-D-II, No. 5, 1989, pp. 733 to 740)" can be used or the image matching method which utilizes the variable density pattern of the fingerprint image and which is described in "Fingerprint Comparison Device Based on Pattern Matching Method (IEICE Technical Report, Vol. PRU 88, No. 83, 1988, pp. 65 to 72)" can be used.

The data transmission unit 130 transmits to a corresponding electrical device the transmission data Dk which has been sent from the transmission data selector unit 122. As for the data transmission method the embodiment is not limited to the method of transmission and the transmission data can be transmitted via infrared rays, wireless, wire or the like.

Figure 2:
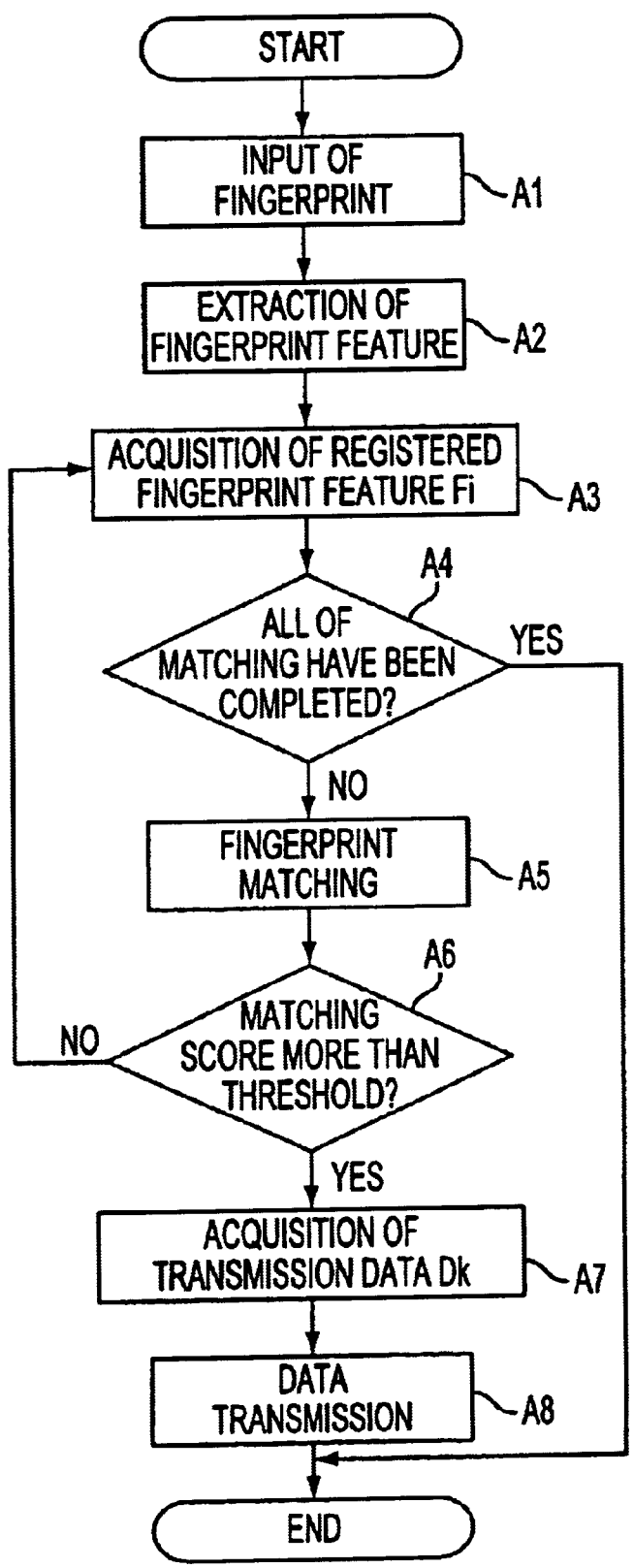
FIG. 2 is a flow chart showing an operation of the first embodiment of the present invention shown in FIG. 1.

An operation of the first embodiment according to the present invention will be discussed with reference to FIG. 1 and a flow chart shown in FIG. 2. First of all, a user stamps an arbitrary one of his/her fingers through the fingerprint image input unit 100. During this process, the input fingerprint image Ij of the user is read out by the fingerprint image input unit 100 at step A1. At step A2, the input fingerprint image Ij is converted into the input fingerprint features Fj by the fingerprint feature extraction unit 110. An arbitrary fingerprint feature Fi (hereinafter, referred to as "the registered fingerprint feature") registered in the storage unit 121 is acquired by the transmission data selector unit 122 at step A3. The acquired registered fingerprint feature Fi has not been compared with the input fingerprint feature Fj. Then, it is determined whether or not the fingerprint matching has already been completed for all of the registered fingerprint features Fi at step A4. If it is determined that the fingerprint matching processing has already been executed for all of the registered fingerprint features Fi (i.e. YES at step A4), then the processing is completed.

On the other hand, if it is determined that the comparison processing has not yet been completed for all of the fingerprint features Fi (i.e. NO at step A4), then the fingerprint matching score of the registered fingerprint features Fi which have been acquired from the storage unit 121 with the input fingerprint features Fj which have been acquired from the fingerprint feature extraction unit 110 is calculated by the transmission data selector unit 122 at step A5. Then, at step A6, it is determined whether or not the calculated fingerprint matching score exceeds a predetermined threshold. If it is determined that the calculated fingerprint matching score exceeds the predetermined threshold (i.e. YES at step A6), the transmission data Di which is registered in the storage unit 121 in correspondence with the registered fingerprint features Fi is acquired as the matched transmission data Dk at step A7. On the other hand, if it is determined that the calculated fingerprint matching score does not exceed the predetermined threshold (i.e. NO at step A6), the processing is returned back to step A3 to acquire another registered fingerprint feature Fi again. When the transmission data Di has been acquired as the transmission data Dk in correspondence with the input fingerprint feature Fj at step A7, the transmission data Dk is transmitted from the data transmission unit 130 to the corresponding electrical device at step A8.

Further description will be given with respect to the first embodiment according to the present invention with reference to the drawings. In this embodiment, a central processing unit (CPU) can be employed as the fingerprint feature extraction unit 110 and the transmission data selector unit 120, and also the data transmission unit 130 can transmit data to the electrical device through infrared light rays. In addition, one example of the correspondence table that is stored in the storage unit 121 is shown in FIG. 4.

Fingerprint features of a user and transmission data for commands to an electrical device are stored in the storage unit 121 so as to correspond to each other. For example, the fingerprint feature of the forefinger of a user A's right hand corresponds to the transmission data for the command "TV 8ch," the fingerprint feature of the thumb of user A's left hand corresponds to the transmission data for the command "Video Cassette Recorder Play," and the fingerprint feature of the middle finger of a user B's right hand corresponds to the transmission data for the command "Audio System CD Play", as shown in FIG. 4.

Now, it is assumed that the user A directs this data transmission apparatus to the television and then the fingerprint image input unit 100 is depressed by the forefinger of the user A's right hand. The fingerprint feature extraction unit 110 extracts the fingerprint features from the input fingerprint image of the forefinger of user A's right hand. The transmission data selection unit 120 determines whether or not the extracted fingerprint features are stored in the storage unit 121 by retrieving registered fingerprint features and carrying out the fingerprint matching. As a result of the match determination, if the corresponding fingerprint features are present in the storage unit 121, then the transmission data which is registered so as to correspond to the fingerprint features of interest is acquired.

In this embodiment, as shown in FIG. 4, since the fingerprint feature of the forefinger of the user A's right hand are registered in the storage unit 121, the data for command "TV 8ch" which is registered so as to correspond to the fingerprint features of interest is acquired. Then, the transmission data selection unit 120 supplies the transmission data indicative of the command "TV 8ch" to the data transmission unit 130 which transmits in turn encoded infrared light rays indicative of the command "TV 8ch" to the television. The television receives the infrared light rays and displays the program broadcast on the channel "8". In such a way, since in this embodiment one data transmission apparatus is employed for a plurality of home electrical apparatuses such as a television, video cassette recorder, audio system and air conditioner, various kinds of apparatuses can be controlled by only changing the user's fingers input in the fingerprint image input unit.

In accordance with the first embodiment according to the present invention, the following effects can be obtained. That is, the finger with which a user manipulates an input device such as the fingerprint image input unit 100 can be specified on the basis of the fingerprint determination. Thus, the transmission data for controlling the electrical device can be distinguished on the basis of the kind of finger of interest. If the user manipulates the input device by changing the finger of interest over to another finger, then the user can transmit different data for making the electrical device execute another command. For this reason, even though only one input device is used a plurality of transmission data can be transmitted, and hence, it is unnecessary to use a plurality of input devices. Also, ease of manipulation and miniaturization of the overall device can be realized. In addition, since the first embodiment according to the invention is configured in such a way that the transmission data is registered so as to correspond to fingerprint features which are ensured to be unique for each user, it is possible to prevent operation by a user who is not yet registered. Also, the transmission data which is already registered by the user can be transmitted only by that person himself/herself. As a result, even if a plurality of people commonly use the data transmission apparatus, the command data in accordance with a particular user's desire can be always transmitted.

Next, a second embodiment of the present invention will be discussed in detail with reference to the drawings.

Figure 5:
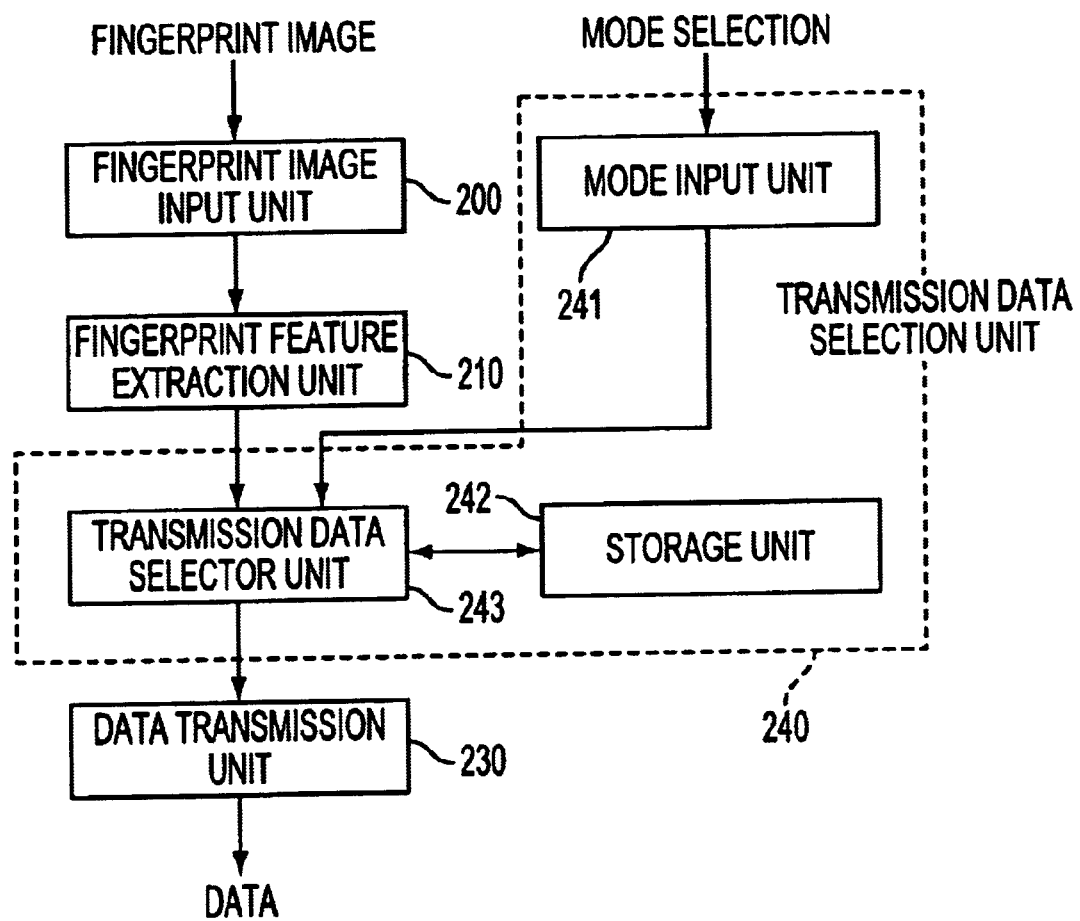
FIG. 5 is a block diagram showing a data transmission apparatus according to a second embodiment of the present invention.

Referring to FIG. 5, the second embodiment of the present invention is substantially different from the above-mentioned first embodiment in that a transmission data selection unit 240 is obtained by changing the configuration of the transmission data selection unit 120 in the first embodiment shown in FIG. 1. That is, a fingerprint image input unit 200, a fingerprint feature extraction unit 210 and a data transmission unit 230 are substantially the same as the fingerprint image input unit 100, the finger feature extraction unit 110 and the data transmission unit 130 described in the first embodiment of the present invention, respectively.

The transmission data selection unit 240 includes a mode input unit 241, a storage unit 242 and a transmission data selector unit 243. The mode input unit 241 receives a mode instruction for selecting a type of data to be transmitted (hereinafter, referred to as "the mode") and sends the mode instruction to the transmission data selector unit 243. In this regard the type of transmission data refers to data for a particular type of electrical device to be controlled, such as a television, video cassette recorder, audio system, or air conditioner. The mode can be selected by inputting a number which is displayed on a display screen (not shown) of the data transmission apparatus in accordance with the selectable mode. The mode selection also can be executed by moving a cursor on the displayed number and then activating it. In addition, a method of selecting the mode displayed on a touch panel (not shown) using an input pen or a user's finger can be executed. The mode selection method by utilizing the user's fingerprint features can be employed. That is, a plurality of modes are registered in correspondence with the user's fingerprint features. The user depresses an input device such as the fingerprint image input unit 200 with one of the user's fingers whereby the mode in correspondence with the fingerprint feature of the user's depressed finger is selected.

Figure 7:
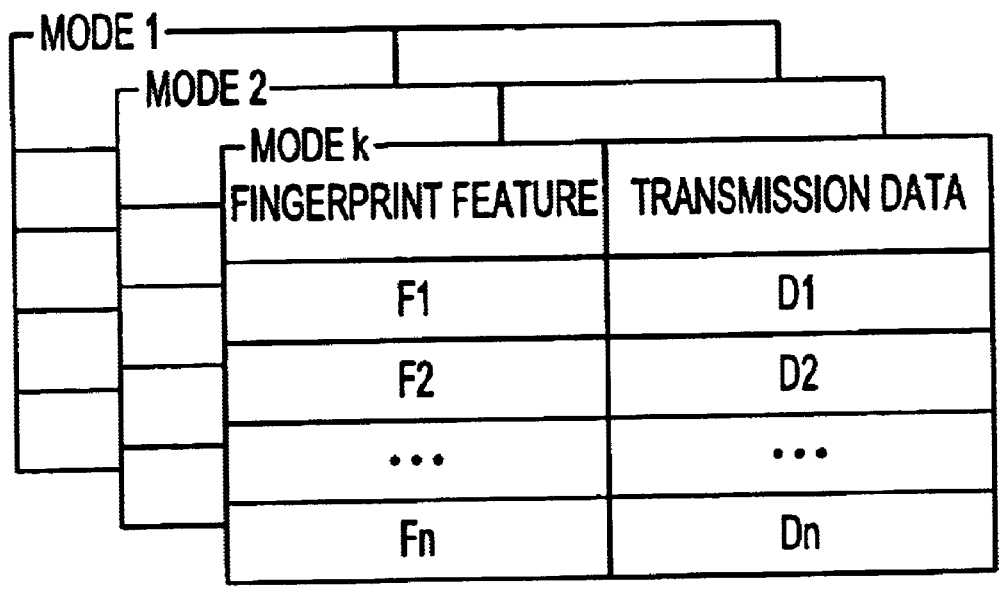
FIG. 7 is a diagram showing data which is stored in the apparatus shown in FIG. 5.

As shown in FIG. 7, the storage unit 242 stores, for every mode, a correspondence table between the fingerprint features Fi (i=1, 2, . . . , N; N is positive integer) and the transmission data Di assigned to the respective fingerprint features Fi. The transmission data selector unit 243 selects the correspondence table for the mode of interest from the storage unit 242 in accordance with the mode instruction input from the mode input unit 241 (hereinafter, referred to as "the selected correspondence table") and carries out the fingerprint matching of the input fingerprint features Fj which have been supplied from the fingerprint feature extraction unit 210 with the registered fingerprint features Fi which are already registered in the correspondence table. If the matched fingerprint feature Fk (k=1, 2, ... , N; N is positive integer) is present in which the fingerprint matching score exceeds a predetermined threshold, the transmission data selector unit 243 sends the transmission data Dk which is registered in the storage unit 242 so as to correspond to the matched fingerprint feature Fk to the data transmission unit 230. Since the method of realizing the fingerprint matching is the same as that in the first embodiment of the present invention, the description thereof is omitted here.

Figure 6:
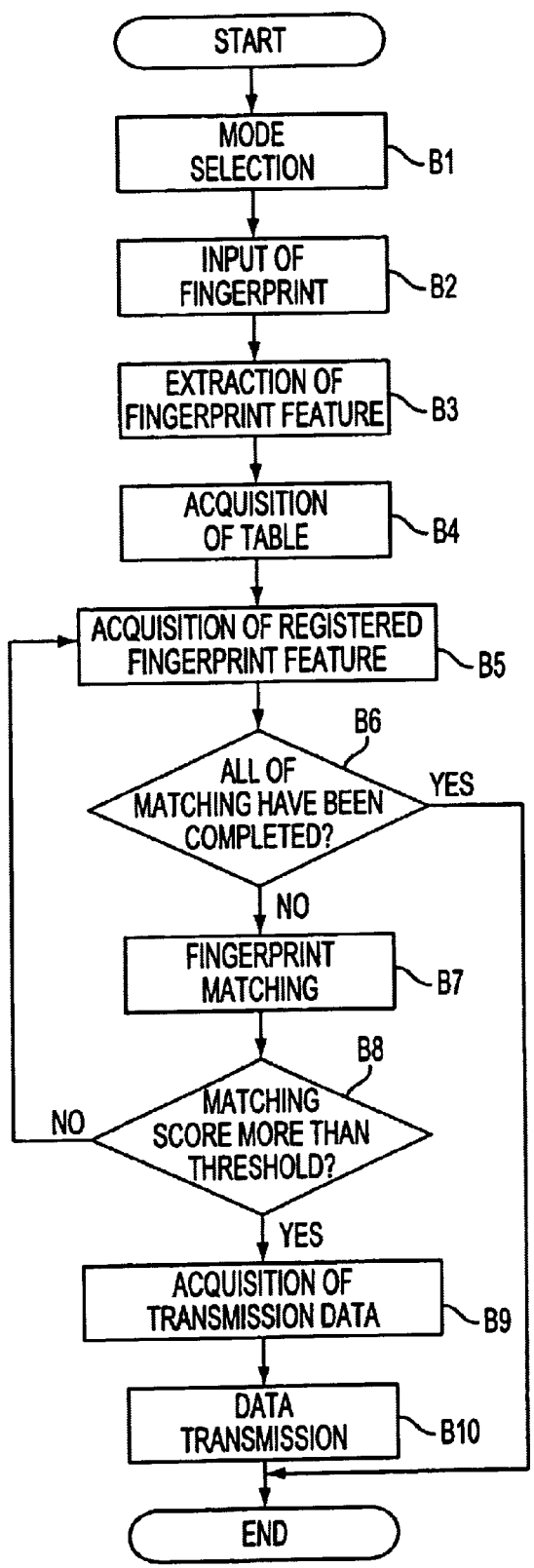
FIG. 6 is a flow chart showing an operation of the second embodiment of the present invention shown in FIG. 5.

The overall operation of the second embodiment of the present invention will be discussed in detail with reference to FIG. 5 and a flow chart shown in FIG. 6.

First of all, the mode with which the data is to be transmitted is selected and the mode instruction is input with the mode input unit 241 at step B1. At steps B2 and B3 the processing of inputting the fingerprint and the processing of extracting the fingerprint features are executed. Since these operations are the same as in steps A1 and A2 of the first embodiment, the description thereof is omitted here. In accordance with the mode instruction, the correspondence table of the mode of interest is selected from the storage unit 242 in the transmission data selector unit 243 at step B4. An arbitrary fingerprint feature Fi (hereinafter, referred to as "the registered fingerprint features") which is already registered in the selected correspondence table, but for which the fingerprint matching is not yet carried out, is acquired in the transmission data selector unit 243 at step B5. At step B6, it is determined whether or not the fingerprint matching has already been completed for all of the registered fingerprint features Fi which are registered in the selected correspondence table. If it is determined that the fingerprint matching has been completed for all of the fingerprint features Fi (i.e. YES at step B6), then the processing is completed.

On the other hand, if it is determined that the fingerprint matching has not yet been completed for all of the fingerprint features Fi (i.e. NO at step B6), then the fingerprint matching score of the registered fingerprint features Fi with the input fingerprint features Fj is calculated by the transmission data selector 243 at step B7. If the calculated fingerprint matching score exceeds a predetermined threshold (i.e. YES at step B8), the matched transmission data Dk which is registered in the selected correspondence table so as to correspond to the matched fingerprint features Fk is obtained at step B9. On the other hand, if the fingerprint matching score does not exceed the predetermined threshold (i.e. NO at step B8), the processing is returned back to step B5 to acquire another registered fingerprint feature again. After the transmission data Dk has been acquired at step B9, the transmission data Dk is transmitted by the data transmission unit 230 at step B10.

Further description will be given with respect to the second embodiment according to the present invention with reference to the drawings. In the second embodiment, in addition to the configuration of the first embodiment described above, a pen input method can be used as the mode input unit 241. In this method, for the modes which are displayed on a display screen of the data transmission apparatus as shown in FIG. 8, the mode of interest can be selected by touching the display screen using the input pen.

Figure 8:
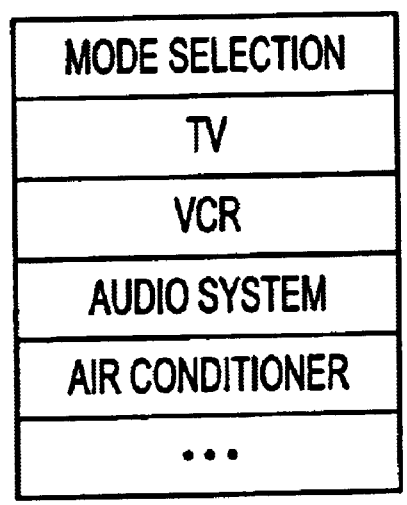
FIG. 8 is a diagram showing a display screen for mode selection in the second embodiment of the present invention.

Now, it is assumed that a user B selects "Air Conditioner Mode" from the mode display screen as shown in FIG. 8, and thereafter, the data transmission apparatus is directed to an air conditioner, and under this state, the middle finger of user B's left hand is pressed on the fingerprint image input unit 200. Then, the fingerprint feature extraction unit 210 extracts the fingerprint features from the fingerprint image which has been obtained from the fingerprint image input unit 200. Moreover, the fingerprint feature extraction unit 210 acquires the correspondence table for the mode which has been selected from the storage unit 242, whereby it is determined whether or not the extracted fingerprint features of interest is already stored in the acquired correspondence table by retrieving the registered fingerprint features and carrying out the fingerprint matching. As a result of the retrieval, if the corresponding fingerprint features are present in the correspondence table, then the transmission data which is registered so as to correspond to the fingerprint features is acquired.

In this embodiment, "air conditioner table" is selected and acquired from the storage unit 242 storing a plurality of tables including "television table", "video cassette recorder table", "audio system table" and "air conditioner table" as shown in FIG. 9. Since the fingerprint features of the middle finger of the user B's left hand is registered in the "air conditioner table", transmission data indicative of the command "cooling to 18° C." is acquired. Then, the transmission data selector unit 243 sends the transmission data indicative of the command "cooling to 18° C." to the data transmission unit 230 which transmits in turn encoded infrared light rays indicative of the command "cooling to 18° C." towards the air conditioner. The air conditioner receives the command "cooling to 18° C.", whereby it renders its target temperature to 18° C. In this embodiment, even if a plurality of persons commonly use one data transmission apparatus, data indicative of the desired temperature setting can be transmitted only by one finger control, and thus the labor of changing the setting for every user can be saved.

In accordance with the second embodiment of the present invention, the following effect can be obtained. That is, this embodiment is designed in such a way that before the fingerprint input has been carried out, the mode of the transmission data is selected and input. For this reason, in the case where the mode selection is not carried out, because a user has only ten fingers, only ten kinds of data can be transmitted. However, in this embodiment, the ten kinds of data can be transmitted for each mode, and hence, the more types of data transmission can be carried out than without mode selection.

Next, a third embodiment according to the present invention will hereinbelow be discussed in detail with reference to the drawings.

Figure 10:
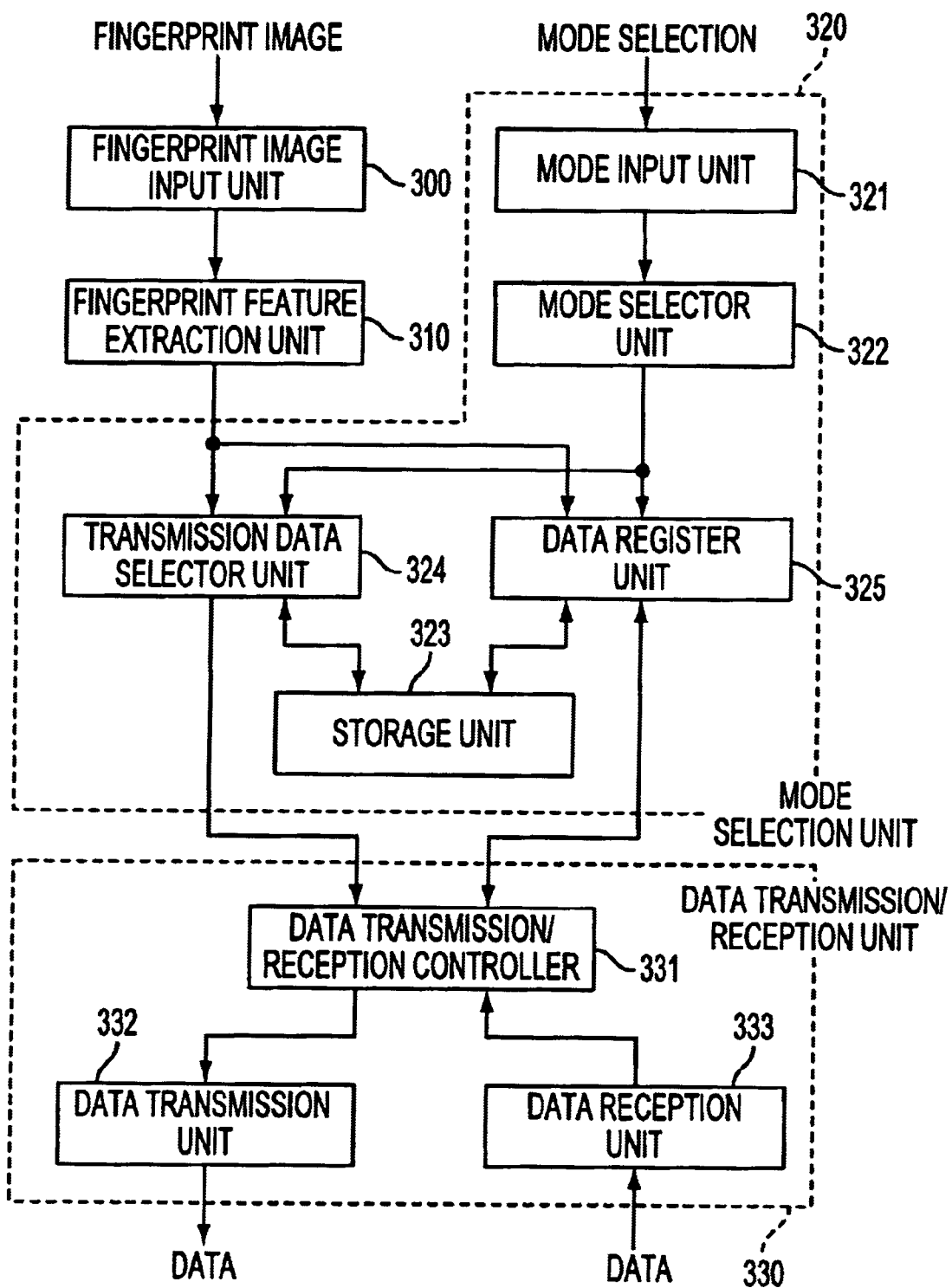
FIG. 10 is a block diagram showing a data transmission apparatus according to a third embodiment of the present invention.

Referring to FIG. 10, the third embodiment of the present invention includes a fingerprint input unit 300, a fingerprint feature extraction unit 310, a mode selection unit 320 and a data transmission unit 330. The fingerprint image input unit 300 is substantially the same as the fingerprint image input unit 100 shown in FIG. 1.

The fingerprint feature extraction unit 310 receives a fingerprint image from the fingerprint image input unit 300 to execute the processing of extracting fingerprint features which are used to discriminate the fingerprint for the fingerprint image of interest. Since the method of extracting the fingerprint feature is the same as that in each of the above-mentioned first and second embodiment, the description thereof is omitted here. Data indicative of the extracted fingerprint features (hereinafter, referred to as "the input fingerprint features") is sent either to a transmission data selector unit 324 or to a data register unit 325. The mode selection unit 320 includes a mode input unit 321, a mode selector unit 322, a storage unit 323, a transmission data selector unit 324 and a data register unit 325.

The mode input unit 321 receives, in addition to reception of the mode instruction as described in the second embodiment of the present invention, an operation mode instruction for selecting a registration mode in which data for controlling an electrical device is newly registered in the storage unit 323. In this connection, in the case where the input operation mode instruction is for the registration mode, the mode input unit 321 further receives an additional mode instruction for selecting the mode table in which the data for controlling the electrical device is newly registered. These input mode instructions are sent to the mode selector unit 322. Since the method of selecting the mode is the same as that in the above-mentioned second embodiment of the present invention, the description thereof is omitted here.

The mode selector unit 322 receives the mode instructions issued from the mode input unit 321. When the operation mode instruction of interest is for the registration mode, the mode selector unit 322 sends both a data registration request and the data indicative of the selected mode to the data register unit 325. When the operation mode instruction is for a mode other than the registration mode, the mode selector unit 322 sends both a data transmission request and the data indicative of the selected mode to the transmission data selector unit 324. The storage unit 323 stores a correspondence table between fingerprint features Fi and transmission data Di assigned to the respective fingerprint features Fi for every mode as shown in FIG. 7.

The transmission data selector 324 selects the correspondence table of the mode of interest from the storage unit 323 in accordance with the data transmission request and the mode instruction (i.e., the type of data to be transmitted) from the mode selector unit 322, and acquires the input fingerprint features Fj from the fingerprint feature extraction unit 310, whereby the fingerprint matching of the input fingerprint features Fj with the registered fingerprint features Fi in the correspondence table is carried out. When the fingerprint feature Fk is present in which the fingerprint matching score exceeds a predetermined threshold, the transmission selector unit 324 sends the transmission data Dk which is registered in the storage unit 323 so as to correspond to the fingerprint feature Fk to a data transmission/reception controller 331. At the same time, the transmission data selector unit 324 sends the data transmission request to the data transmission/reception controller 331. Since the method of matching the fingerprint is the same as that in each of the above-mentioned first and second embodiment of the present invention, the description thereof is omitted here.

The data register unit 325 receives the data registration request made from the mode selector unit 322 and sends a data reception request to the data transmission/reception controller. In response to the data reception request, the data register unit 325 receives reception data Dj which is supplied from the transmission/reception controller 331. Further, the data register unit 325 selects, in accordance with the mode instruction (i.e., the type of data to be newly registered) sent from the mode selector unit 322, the correspondence table of the mode of interest from the storage unit 323, and acquires the input fingerprint features Fj from the fingerprint feature extraction unit 310, whereby the fingerprint matching of that input fingerprint features Fj with the registered fingerprint features Fi which is registered in the correspondence table is carried out. When the fingerprint feature Fk is present in which the fingerprint matching score exceeds a predetermined threshold, the data register unit 325 overwrites the reception data Dj for registration which has been received from the data transmission/reception controller 331 instead of the data Dk which is registered so as to correspond to the fingerprint feature Fk. In this connection, when overwriting the reception data Dj for registration, a user may confirm the overwriting for registration. When the fingerprint feature Fk is absent in which the fingerprint matching score exceeds the predetermined threshold, the data register unit 325 newly registers the input fingerprint feature Fj and the reception data Dj in the correspondence table so as to correspond to each other. Since the method of matching the fingerprint is the same as that in each of the above-mentioned first and second embodiment of the present invention, the description thereof is omitted here.

The data transmission/reception unit 330 includes a data transmission/reception controller 331, a data transmission unit 332 and a data reception unit 333. The data transmission/reception controller 331 receives the data transmission request and the transmission data Dk from the transmission data selector 324 and sends the transmission data Dk to the data transmission unit 332. Moreover, the data transmission/reception controller 331 receives the data reception request made from the data register 325, and receives the reception data Dj from the data reception unit 333 to send the reception data Dj to the data register unit 325. Furthermore, the data transmission unit 332 transmits, similarly to the above-mentioned first and second embodiment of the present invention, the transmission data Dk supplied from the data transmission/reception controller 331. As for the data transmission method, the embodiment is not limited to the method of transmission and the transmission data can be transmitted via infrared rays, wireless, wire or the like. The data reception unit 333 receives the reception data Dj from another device, and sends the reception data Dj to the data transmission/reception controller 331. As for the data receiving method, the embodiment is not limited to the method of receiving data and the data can be transmitted via infrared rays, wireless, wired, or the like.

Figure 11:
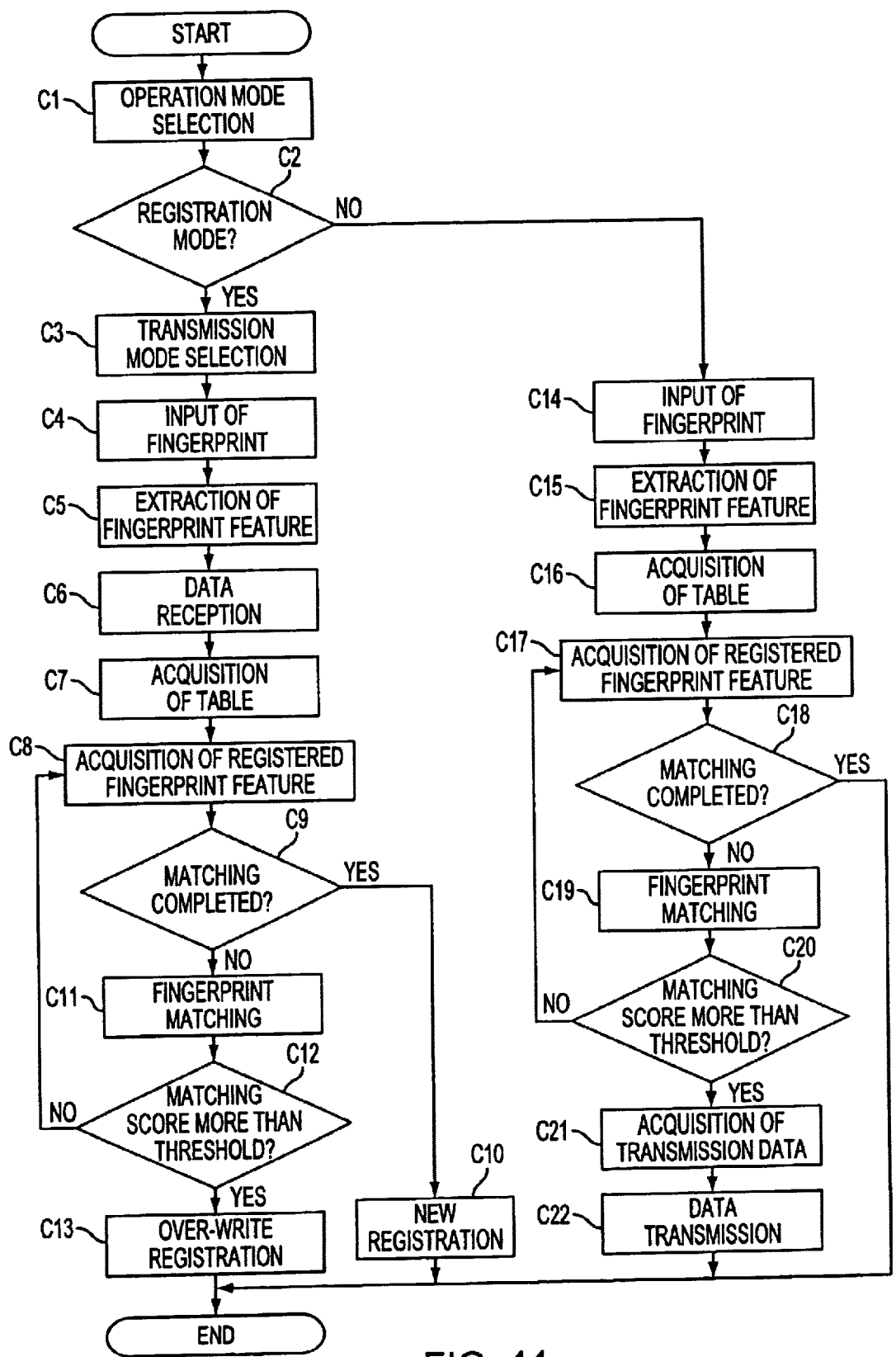
FIG. 11 is a flow chart showing an operation of the third embodiment of the present invention shown in FIG. 10.

The overall operation of the third embodiment according to the present invention will be discussed in detail with reference to FIG. 10 and a flow chart shown in FIG. 11. The mode in which the transmission data in accordance with the input fingerprint feature is transmitted or the registration mode is selected and input by the mode input unit 321 at step C1. It is determined whether or not the input mode is the registration mode at step C2. When it is determined that the mode of interest is a mode other than the registration mode (i.e. NO at step C2), the fingerprint image is input by the fingerprint image input unit 300 at step C14. Since the fingerprint image input operation is the same as that in each of the above-mentioned first and second embodiment, the description thereof is omitted here.

The input fingerprint image Ij is converted into the fingerprint features Fj by the fingerprint feature extraction unit 310 at step C15. Then, by the transmission data selector unit 324, in accordance with the mode instruction input from the mode input unit 321, the correspondence table of the mode of interest is selected from the storage unit 323 at step C16. At step C17, by the transmission data selector unit 324, an arbitrary registered fingerprint feature Fi is acquired which is registered in the selected correspondence table, but for which the fingerprint matching is not yet carried out. In this connection, if the fingerprint matching has already been completed for all of the fingerprint features Fi which are registered in the selected correspondence table (i.e. YES at step C18), then the processing will be completed.

On the other hand, if the fingerprint matching has not yet been completed for all of the fingerprint features Fi which are registered in the selected correspondence table (i.e. NO at step C18), then, the fingerprint matching score of the registered fingerprint features Fi with the input fingerprint features Fj is calculated by the transmission data selector unit 324 at step C19. If the calculated fingerprint matching score exceeds a predetermined threshold (i.e. YES at step C20), then the transmission data Dk is acquired at step C21, which is registered in the selected correspondence table so as to correspond to the registered fingerprint features Fi. On the other hand, if the fingerprint matching score does not exceed the predetermined threshold (i.e. NO at step C20), then the processing is returned back to Step C17 to acquire another registered fingerprint feature again. If the transmission data Dk is acquired at step C21, then the data transmission unit 332 transmits the transmission data Dk at step C22.

If the mode that has been input at step C1 is the registration mode (i.e. YES at step C2), then the type of data to be newly registered is selected from the mode input unit 321 as an additional mode instruction at step C3. Thereafter, while the processing of inputting the fingerprint at step C4 and the processing of extracting the fingerprint features at step C5 are executed. Since these operations at steps C4 and C5 are the same as steps A1 and A2 in the case of the data transmission mode in the above-mentioned first embodiment according to the invention, the description thereof is omitted here.

The reception data Dj to be newly registered in the storage unit 323 is received by the data reception 333 at step C6. At step C7, by the data register unit 325, in accordance with the additional mode instruction from the mode input unit 321 at step C3, the correspondence table of the mode of interest is selected from the storage unit 323. An arbitrary registered fingerprint feature Fi which is registered in the selection correspondence table, but for which the fingerprint matching is not yet carried our is acquired by the data register unit 325 at step C8. If the fingerprint matching has already been completed for all of the fingerprint features Fi which is acquired in the selected correspondence table (i.e. YES at step C9), then the input fingerprint feature Fj and the reception data Dj which has been acquired from the data transmission/reception controller 331 are newly registered in the selected correspondence table so as to correspond to each other at step C10.

On the other hand, if the fingerprint matching for all of the fingerprint features Fi has not yet been completed (i.e. NO at step C9), then the fingerprint matching score of the registered fingerprint features Fi with the input fingerprint feature Fj is calculated by the data register 325 at step C11. If the fingerprint matching score exceeds a predetermined threshold (i.e. YES at step C12), then the reception data Dh which has been acquired from the data transmission/reception controller 331 is overwritten for registration instead of the registered data Di which is registered so as to correspond to the registered fingerprint features Fi at step C13. On the other hand, if the fingerprint matching score does not exceed the predetermined threshold (i.e. NO at step C12), then the processing is returned back to step C8 to acquire another registered fingerprint feature again.

Further description will be given with respect to the third embodiment according to the present invention with reference to the drawings.

Now, it is assumed that a user C selects "Registration Mode" from a mode selection display screen (not shown). In the case where a mode other than "Registration Mode" is selected, the third embodiment operates similarly to the second embodiment of the present invention. Since "Registration Mode" is selected in the third embodiment, it is assumed here that next, the user C selects "Video Tape Recorder Mode" from the mode display screen, and then presses the fingerprint image input unit 300 with his/her thumb of the right hand and at the same time, presses down the play button of the video cassette recorder remote controller towards the video cassette recorder to transmit the infrared code indicative of the command "Video Cassette Recorder Play" thereto. The fingerprint feature extraction unit 310 extracts the fingerprint feature from the fingerprint image, and acquires the correspondence table of the mode, and also retrieves whether or not the fingerprint features is stored in the correspondence table by carrying out the fingerprint matching. If it is determined as a result of the retrieval that the corresponding fingerprint features is present in the correspondence table, the data which has been received from the data reception unit 333 is overwritten for registration instead of the transmission data which is already registered so as to correspond to the fingerprint features of interest. On the other hand, if it is determined as a result of the retrieval that the corresponding fingerprint features is absent in the correspondence table, then the input fingerprint features and the data which has been received from the data reception unit 333 are newly registered in that correspondence table so as to correspond to each other.

In the third embodiment, as shown in FIG. 9, first of all, "Video Table" is acquired from the storage unit 323. Then, since the fingerprint features of the thumb of the user C's right hand is not yet registered in "Video Table", the fingerprint features of "Thumb of the user C's right hand" and the infrared rays code indicative of the command "Video Cassette Recorder Play" which has been received by the data reception unit 333 are newly registered so as to correspond to each other. As a result of the new registration, "Video Table" of the storage unit 323 becomes as shown in a concrete example of the operation of FIG. 12. Since in the third embodiment, it is possible to register the infrared rays code which is to a user's taste, it is possible to optimize the remote controller functions which are frequently used and incorporate them into one device of the present invention In accordance with the third embodiment mode of the invention, the following effect can be obtained. That is, the third embodiment according to the present invention is designed in such a way that the registered mode is added thereto when selecting the mode, and the data is received during the registration mode. As a result, the data from an arbitrary apparatus can be received and registered, and also the functions of a plurality of apparatuses can be controlled by one device.

As set forth hereinabove, according to a portable information terminal device of the present invention, the following several effects can be obtained. That is, the first effect is such that since commands which a user wants to register can be registered so as to correspond to the fingerprint features, the functions of a plurality of types of remote controllers can be integrated into one device. In addition, the second effect is such that even though only one input device is used, the transmission command can be selected only by changing from using one finger over to using another finger, the command can be readily transmitted. Further, the third effect is such that since the selection can be made only by changing using one finger over to using another finger similarly to the foregoing, a plurality of types of commands can be transmitted using one input device and also the miniaturization of the overall device can be realized. In addition, the fourth effect is such that since the transmission commands are registered so as to correspond to the fingerprint features in which uniqueness is ensured, and hence, the command of interest can be transmitted thereto only by the person himself/herself, a user of the device can be specified. Then, the fifth effect is, from the same reason as that in the fourth effect, such that even if a plurality of people commonly use one device, the command can be transmitted with the setting depending on the tastes of individual users without carrying out a reset operation.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes of the claims are therefore intended to be embraced therein.

What is claimed is:

1. A data transmission apparatus, comprising:
    a storage unit for storing at least a first and a second fingerprint features per one user and transmission data for at least a first and a second commands associated with said first and second fingerprint features, respectively, said first and second commands being different from each other;
    a fingerprint reader for acquiring the fingerprint feature of the user's finger; and
    a transmitter for reading out the commands from said storage unit in accordance with the acquired fingerprint feature as transmission data and transmitting the transmission data to the electrical device.

2. The data transmission apparatus as claimed in claim 1, wherein the electrical device is controlled based on the transmission data.

3. The data transmission apparatus as claimed in claim 1, wherein said storage unit has a plurality of tables for the electrical device, and each of the tables stores the control data in accordance with the fingerprint feature.

4. The data transmission apparatus as claimed in claim 3, further comprising a table selector for selecting one of the tables according to an electrical device to be controlled; and
    wherein said transmitter reads out the stored control data from the selected one of tables in accordance with the acquired fingerprint feature as the transmission data and transmitting the transmission data to the electrical device which corresponds to the selected one of tables.

5. The data transmission apparatus as claimed in claim 3, wherein each of the tables stores the data for controlling one of a television, a video cassette recorder, an audio system and an air conditioner in association with the fingerprint feature of the user's finger.

6. The data transmission apparatus as claimed in claim 1, wherein said fingerprint reader has an input unit for inputting an image of a fingerprint of the user's finger and an extraction unit for extracting the fingerprint feature based on the input image of the fingerprint.

7. The data transmission apparatus as claimed in claim 6, wherein said transmitter comprises a comparator for comparing the extracted fingerprint feature by said extraction unit of said fingerprint reader with the stored fingerprint feature in said storage unit.

8. The data transmission apparatus as claimed in claim 1, further comprising:
    a register for registering a non-stored control data for controlling an electrical device in said storage unit in association with fingerprint feature of the user's finger.

9. The data transmission apparatus as claimed in claim 8, wherein said register over-writes the non-stored control signal on the stored control data.

10. A method of transmitting control data for controlling an electrical device, the method comprising:
    acquiring a fingerprint feature of a user's finger;
    selecting control data from a storage unit in accordance with the acquired fingerprint feature, wherein said storage unit stores at least a first and a second fingerprint features per one user and transmission data for at least a first and a second commands associated with said first and second fingerprint features, respectively, said first and second commands being different from each other; and
    transmitting the control data read out from said storage unit to an electrical device.

11. The method as claimed in claim 10, wherein the electrical device is controlled based on the control data.

12. The method as claimed in claim 10, further comprising:
    inputting an image of a fingerprint of the user's finger; and
    extracting the fingerprint feature of the user's finger based on the input image of the fingerprint.

13. The method as claimed in claim 12, wherein said storage unit stores the control data in association with fingerprint feature of the user's finger.

14. The method as claimed in claim 13, further comprising;
    comparing the extracted fingerprint feature with the stored fingerprint feature in the storage unit.

15. The method as claimed in claim 10, further comprising:
    selecting one of a plurality of tables which are included in said storage unit and are prepared for electrical devices, each of tables storing the control data for controlling a corresponding electrical device; and
    reading out the control data from the selected one of tables in accordance with the acquired fingerprint feature.

16. A remote controller for controlling an electrical device, comprising:
    a storage unit for storing a first control data and a second control data, wherein the first control data for controlling a first electrical device corresponds to a first fingerprint feature of a user's first finger and the second control data for controlling a second electrical device corresponds to a second fingerprint feature of a user's second finger;
    a fingerprint reader coupled to said storage unit, for acquiring one of the first and second fingerprint features, whereby reading out the first control data when the first fingerprint feature is acquired, and the second control data when the second fingerprint feature is acquired; and
    a transmitter coupled to said fingerprint reader, for transmitting the first control data when the first fingerprint feature is acquired by said fingerprint reader, and transmitting the second control data when the second fingerprint feature is acquired by said fingerprint reader.

17. The remote controller as claimed in claim 16, wherein the electrical device is controlled based on one of the first and second control data.

18. The remote controller as claimed in claim 16, further comprising:
    a data receiver for receiving a third control data for controlling the electrical device;

a register coupled to said data receiver and said storage unit, for registering the third control data in said storage unit, wherein the third control data is associated with a third fingerprint feature of a user's third finger.

19. The remote controller as claimed in claim 16, further comprising:

a data receiver for receiving a third control data for controlling the electrical device;

a register coupled to said data receiver and said storage unit, for over-writing the third control data on the first control data stored in said storage unit, wherein the first control data is associated with the first fingerprint feature.

20. The remote controller as claimed in claim 16, wherein the electrical device is one of a television, a video cassette recorder, an audio system and an air conditioner.

21. The remote controller as claimed in claim 16, wherein said fingerprint reader comprises:

an scanner for obtaining an image of a fingerprint of at least one of the user's first and second fingers; and an extraction unit for extracting at least one of the first and second fingerprint features based on the image obtained by said scanner.

22. A remote controller, comprising:

a storage unit having a first table and a second table, wherein the first table stores first control data for controlling a first electrical device, wherein the first control data is associated with a first fingerprint feature of a user's first finger, and the second table stores a second control signal for controlling a second electrical device, wherein the second control data is associated with a second fingerprint feature of the user's second finger;

a first table selector for selecting one of the first and second tables;

a fingerprint reader coupled to said storage unit and said first table selector, for acquiring one of the first and second fingerprint feature, whereby reading out the first control data from the first table of said storage unit when the first table is selected by said first table selector and the first fingerprint feature is acquired, and reading out the second control data from the second table of said storage unit when the second table is selected by said first table selector and the second fingerprint feature is acquired; and a transmitter for transmitting one of the first control data and the second control data, which is read out from one of the tables of said storage unit by said fingerprint reader.

23. The remote controller as claimed in claim 22, wherein the first electrical device is controlled based on the first control data when the first control data is transmitted from said transmitter, and the second electrical device is controlled based on the second control data when the second control data is transmitted from said transmitter.

24. The remote controller as claimed in claim 22, further comprising;

a second table selector for selecting one of the first and second tables;

a data receiver for receiving a third control data for controlling one of the first and second electrical devices;

a register coupled to said second table selector, said data receiver and said storage unit, for registering the third control data in association with a third fingerprint feature of a user's third finger, wherein the third control data is stored in the first table of said storage unit when the first table is selected by said second table selector and stored in the second table of said storage unit when the second table is selected by said second table selector.

25. The remote controller as claimed in claim 22, wherein the first and second electrical devices are different from each other and each are one of a television, a video cassette recorder, an audio system and an air conditioner.

26. The remote controller as claimed in claim 22, wherein said fingerprint reader comprises:

an scanner for obtaining an image of a fingerprint of at least one of the user's first and second fingers; and an extraction unit for extracting at least one of the first and second fingerprint features based on the image obtained by said scanner.

* * * * *